: United States Patent  
Matsubara

(10) Patent No.: US 7,280,158 B2
(45) Date of Patent: Oct. 9, 2007

(54) VIDEO SYNTHESIZING APPARATUS

(75) Inventor: Kenjiro Matsubara, Osaka (JP)

(73) Assignee: Matsushita Electric industrial Co., Ltd., Osaka (JP)

( * ) Notice: Subject to any disclaimer, the term of this patent is extended or adjusted under 35 U.S.C. 154(b) by 518 days.

(21) Appl. No.: 10/492,533

(22) PCT Filed: Nov. 8, 2002

(86) PCT No.: PCT/JP02/11663

§ 371 (c)(1),
(2), (4) Date: Aug. 26, 2004

(87) PCT Pub. No.: WO03/041403

PCT Pub. Date: May 15, 2003

(65) Prior Publication Data

US 2005/0041153 A1 Feb. 24, 2005

(30) Foreign Application Priority Data

Nov. 9, 2001 (JP) ............................. 2001-344435

(51) Int. Cl.
H04N 9/76 (2006.01)
H04N 9/74 (2006.01)

(52) U.S. Cl. .................... 348/598; 348/584; 348/588; 348/589; 348/586

(58) Field of Classification Search ................ 348/598, 348/589, 600, 584, 586, 563, 564, 565, 567, 348/568, 588, 578; 382/284
See application file for complete search history.

(56) References Cited

U.S. PATENT DOCUMENTS 4,568,981 A 2/1986 Beaulier
(Continued)

FOREIGN PATENT DOCUMENTS

EP 0108520 5/1984
(Continued)

OTHER PUBLICATIONS

English Language Abstract of JP 8-107552.
(Continued)

Primary Examiner—David Ometz
Assistant Examiner—Jean W. Désir
(74) Attorney, Agent, or Firm—Greenblum & Bernstein, P.L.C.

(57) ABSTRACT

A data amount of a still image to be synthesized is reduced to shorten a transmission time and to reduce a memory utilization spent by the image. The display position of the still image to be synthesized is easily changed to improve operation efficiency. A video synthesizing apparatus which synthesizes a video with a still image includes a video signal receiving unit which receives a video signal including a video, a communication unit which receives a composite signal including a still image having a display size smaller than the display size of the video and position data expressing a synthesis position of the still image with respect to the video, a storage unit which stores the still image and the position data obtained from the composite signal received by the communication unit, and a synthesizing unit which synthesizes the video obtained from the video signal received by the video signal receiving unit and the still image stored in the storage unit on the basis of the position data stored in the storage unit to output a synthesized image.

11 Claims, 10 Drawing Sheets

U.S. PATENT DOCUMENTS

| | | | |
|---|---|---|---|
| 4,602,286 A * | 7/1986 | Kellar et al. | 348/597 |
| 5,646,679 A * | 7/1997 | Yano et al. | 348/47 |
| 5,668,805 A | 9/1997 | Yoshinobu | |
| 5,847,770 A | 12/1998 | Yagasaki | |
| 5,982,951 A * | 11/1999 | Katayama et al. | 382/284 |
| 6,046,777 A * | 4/2000 | Patton et al. | 348/565 |
| 6,046,778 A | 4/2000 | Nonomura et al. | |
| 6,069,669 A * | 5/2000 | Park et al. | 348/596 |
| 6,262,778 B1 * | 7/2001 | Nonweiler et al. | 348/586 |
| 6,285,407 B1 | 9/2001 | Yasuki et al. | |
| 6,621,932 B2 * | 9/2003 | Hagai et al. | 382/233 |
| 6,753,929 B1 * | 6/2004 | Sheraizin et al. | 348/586 |
| 6,803,968 B1 * | 10/2004 | Numata | 348/584 |
| 6,961,097 B2 * | 11/2005 | Yui | 348/584 |
| 7,042,517 B2 * | 5/2006 | Hirano | 348/588 |
| 2001/0048481 A1 | 12/2001 | Hatano et al. | |
| 2003/0025836 A1 * | 2/2003 | An et al. | 348/584 |

FOREIGN PATENT DOCUMENTS

| | | |
|---|---|---|
| EP | 0473391 | 3/1992 |
| EP | 0700211 | 3/1996 |
| EP | 0765082 | 3/1997 |
| EP | 1158788 | 11/2001 |
| GB | 2259219 | 3/1993 |
| JP | 2-033188 | 2/1990 |
| JP | 7-154350 | 6/1995 |
| JP | 8-107552 | 4/1996 |
| JP | 8-275057 | 10/1996 |
| JP | 8-317353 | 11/1996 |
| JP | 10-174007 | 6/1998 |
| JP | 2000-92447 | 3/2000 |
| JP | 2000-092447 | 3/2000 |
| JP | 11-252518 | 9/2000 |
| JP | 2001-333348 | 11/2001 |
| WO | 96/19077 | 6/1996 |
| WO | 01/33835 | 5/2001 |

OTHER PUBLICATIONS

English Language Abstract of JP 8-317353.
English Language Abstract of JP 7-154350.
English Language Abstract of JP 10-174007.
English language Abstract of JP 2-033188.
English Language Abstract of W.I.P.O. 01/33835.
English Language Abstract of JP 2000-92447.
English Language Abstract of JP 11-252518.
English Language Abstract of JP 8-275057.
English Language Abstract of JP 2001-333348.

* cited by examiner

VIDEO SYNTHESIZING APPARATUS

BACKGROUND OF THE INVENTION

1. Field of the Invention

The present invention relates to a technique which synthesizes a video and a still image.

2. Background and Prior Art

In television interests or the like, an image synthesizing process which displays telop characters on a video photographed by a video camera or a video reproduced by a video player is popularly performed. In image synthesis, an apparatus such as a switcher is used. FIG. 1 is a typical view showing image synthesis performed by a switcher 1. The switcher device 1 receives a background video 2 and a telop video 3 to be synthesized and synthesizes these videos. More specifically, the switcher device 1 receives a video signal corresponding to the background video 2 through a video cable 4 for transmitting a video signal. The switcher device 1 receives a video signal corresponding to the telop video 3 through a video cable 5 for transmitting a video signal. The switcher 1 synthesizes the two received video signals according to an operation instruction based on an operation of a user or a control instruction from an external device (not shown) to generate a synthesis video signal and to output the synthesis video signal. FIG. 1 shows a video 7 expressed by the synthesis video signal.

When images are to be synthesized by a switcher, a technique called Chromakey is mainly used. The outline of the Chromakey technique is as follows. A video signal for the background image 2 is input, and a video signal expressing a character having a blue background is input as the telop image 3. An image obtained by extracting a part except for a blue part of the telop image 3 from the background image 2 and an image obtained by extracting a blue part from the telop image 3 are synthesized to obtain a synthesis image 7. In image synthesis using a Chromakey technique, when the telop image 3 is input to the switcher 1, the video signal of an image having the same size as that of a screen is frequently transmitted as a component signal or the like of an analog format.

However, in the above method, a still image (telop character or the like) is displayed on only a lower part of the screen, the still image 3 having the same size as that of the entire screen is necessary. For this reason, an amount of signal (data amount of the still image 3) flowing in the video cable (transmission path) 5 increases and is wasted.

In addition, the data amount of the still image 3 increases, a memory capacity spent by one image increases. Therefore, in order to store and display a large number of images, a memory having a large capacity is necessary, and the cost of the apparatus becomes high. In addition, when the position of telop characters to be displayed is changed, the image data of the image must be changed and transmitted again, and therefore operation efficiency becomes poor.

SUMMARY OF THE INVENTION

It is an object of the present invention to decreases a data amount of a still image to be synthesized to shorten a transmission time and to decrease a memory utilization spent by an image. It is another object of the present invention to easily change a display position of a still image for synthesizing to improve operation efficiency.

A video synthesizing apparatus according to the present invention is a video synthesizing apparatus which synthesizes a video and a still image. The video synthesizing apparatus includes a video signal receiving unit which receives a video signal including a video; a communication unit which receives a composite signal including a still image having a display size smaller than the display size of the vide and position data representing a synthesis position of the still image with respect to the video; a storage unit which stores the still image obtained from the composite signal received by the communication unit and the position data; and a synthesis unit which synthesizes the video obtained from the video signal received by the video signal receiving unit with the still image stored in the storage unit.

The video synthesizing apparatus may further include a change control unit which continuously changes the position data stored in the storage unit to continuously change a synthesis position of the still image with respect to the video.

The storage unit may store a plurality of still images and a plurality of position data corresponding to the still images, and the synthesis unit may synthesize the video with the plurality of still images on the basis of the plurality of position data, respectively, and output the synthesized images.

The video synthesizing apparatus may further include a frame acquiring unit which acquires the video obtained from the video signal as a frame image, and the communication unit may output the frame image acquired by the frame acquiring unit.

The communication unit may transmit/receive a control command for controlling an operation of a video synthesizing apparatus.

An amount of information of the video included in the video signal may be compressed.

An amount of information of a still image included in the composite signal may be compressed.

An amount of information of the video included in the video signal may be compressed, and an amount of information of the still image included in the composite signal may not be compressed.

The video signal receiving unit may receive a video signal generated on the basis of data recorded on a mobile recording medium.

The communication unit may receive a composite signal generated on the basis of data recorded on a mobile recording medium.

At least one of the video signal receiving unit and the communication unit is connected to a network for transmitting data, and may receive at least one of the video signal and the composite signal.

The video signal has a part expressing a video and a blanking part except for the part expressing the video, the composite signal is interleaved in the blanking part of the video signal, and the video signal receiving unit may separate the composite signal from the received video signal to transmit the composite signal to the communication unit.

In the video synthesizing apparatus according to the present invention, data of a still image for synthesizing with a video signal and position data of the still image are input. Since the still image is constituted by only a part displayed on the video signal, an amount of data flowing in the transmission path may decrease to make it possible to suppress the cost of the transmission path. In addition, since a data amount of the still image decreased, a memory capacity spent to hold the still image decreases. Therefore, the cost of the synthesizer itself can be suppressed.

Since a still image can be moved by changing position data, a change in position of the still image or scrolling can be easily performed.

Operations will be described below.

According to the first invention, a still image can be displayed at an arbitrary position on a video signal on the basis of position data. A display position of the still image can be easily changed, and, when telop characters are displayed in only a partial region of a screen, the size of the still image can be constituted by only the part of the displayed telop characters. An amount of data of the still image transmitted to the apparatus is smaller than an amount of data of a still image having the same size as that of an entire screen. For this reason, a transmission time is shortened, and the cost of the transmission path can be suppressed. Since a memory capacitance spent by one image decreases in the apparatus, a large number of still images can be stored while suppressing the cost of a memory.

According to the second invention, position data stored in the storage unit can be changed by a program on the apparatus side. A display position of a still image displayed on a video signal is automatically changed to make it possible to move the still image.

According to the third invention, a plurality of still images can be simultaneously displayed on a video signal. The plurality of still images are horizontally or vertically arranged to change the display positions of the still images, so that a telop having several screens can be scrolled. The plurality of still images can be synthesized and output. Even though a video signal is not input, only the still images can be synthesized.

According to the fourth invention, a synthesizing apparatus includes a frame acquiring unit which takes a video of an input video image as a still image, so that the taken still image can be output by the communication unit. One scene of the video signal is taken and stored as a still image, and can be used in image synthesis with another still image later.

According to the fifth invention, the transmission unit can transmit/receive control data for the apparatus. The video synthesizing apparatus can be controlled by an external device which transmits a still image and position data thereof to the video synthesizing apparatus.

According to the sixth and seventh inventions, at least one of an input video image and an input still image is compressed data. Use of the compressed data can suppress the cost of a transmission path or a memory.

According to the eighth invention, an input video signal is compressed data, and an input still image is non-compressed data. Only a telop is transmitted while being non-compressed and displayed on the video signal, so that a telop having quality higher than quality obtained when a synthesized image with a telop is compressed and transmitted.

According to the ninth and tenth inventions, at least one of input to a video signal input unit and input to the communication unit can be performed by a mobile recording medium. A photographed video and a telop thereof can be used in synthesis at a remote place.

According to the eleventh invention, at least one of input to the video signal receiving unit and input to the communication unit is connected to a cable network or a wireless network, and at least one of a video signal and a composite signal is received from a network. In this manner, a photographed video and a telop thereof can be used in synthesis at a remote place.

According to the twelfth invention, a composite signal is interleaved in a blanking part of a video signal, and the video signal receiving unit separates the composite signal from the received video signal to transmit the composite signal to the communication unit. Since all the video signals and the video signals can be obtained from the video signal input unit, the cost of the transmission path can be suppressed.

BRIEF DESCRIPTION OF THE DRAWINGS

The present invention will become readily understood from the following description of preferred embodiments thereof made with reference to the accompanying drawings, in which like parts are designated by like reference numeral, and in which.

DETAILED DESCRIPTION OF THE PREFERRED EMBODIMENTS

An embodiment of the present invention will be described below with reference to the drawings.

Figure 1:
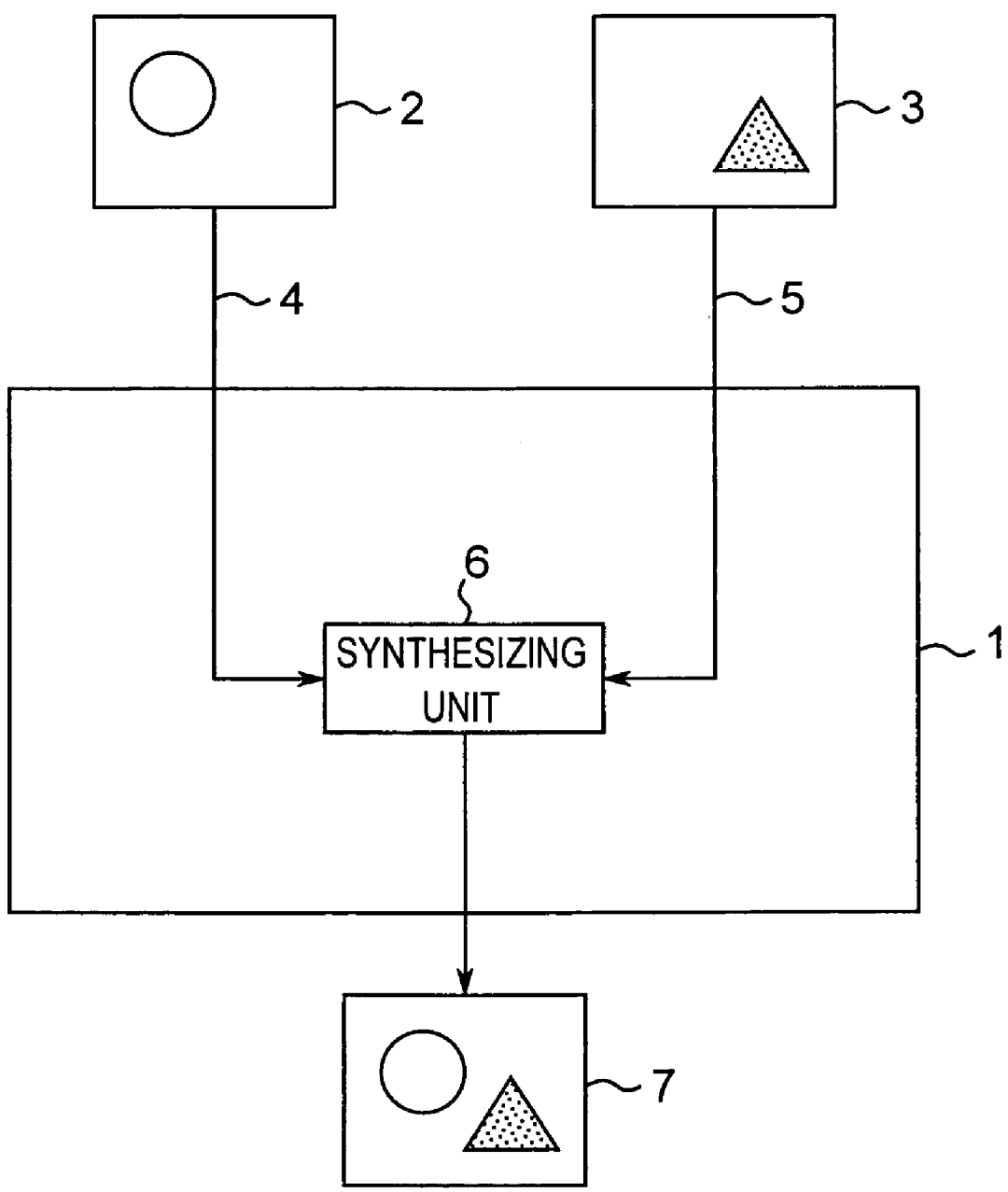
FIG. 1 is a typical diagram showing synthesis of images by a switcher.
Figure 2:
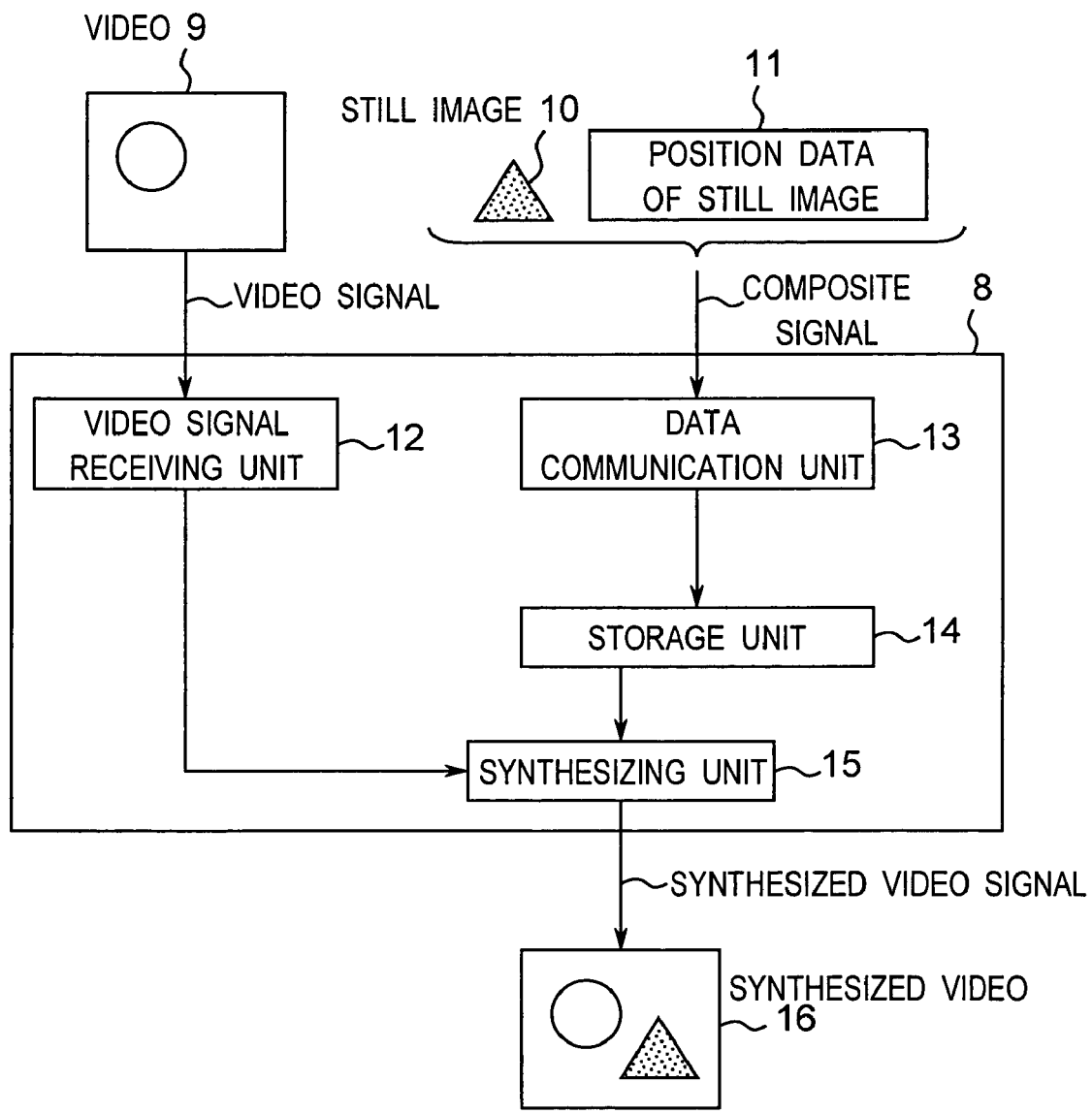
FIG. 2 is a block diagram showing the configuration of a first video synthesizing apparatus according to the embodiment.

FIG. 2 is a block diagram showing the configuration of a video synthesizing apparatus 8. The video synthesizing apparatus 8 includes a video signal receiving unit 12, a data communication unit 13, a storage unit 14, and a synthesizing unit 15. The video synthesizing apparatus 8 synthesizes a video 9 with a still image 10 to generate a synthesized video 16.

The constituent elements of the video synthesizing apparatus 8 will be described below. The video signal receiving unit 12 receives the video 9 as a video signal from an external device such as a video player or a camera and outputs the video 9 to the synthesizing unit 15. The video 9 may be a motion picture or a still image. The data communication unit 13 receives a signal from an external device such as a personal computer (to be referred to as a PC hereinafter). The signal is a composite signal including the still image 10 to be synthesized with the video 9 and position data 11 of a still image to be input on the video signal. The still image 10 may be an appropriate graphic as shown in FIG. 2 or may be a caption or the like. The still image 10 and the position data will be described later. The video signal and the composite signal are transmitted through an SDI cable, a composite cable, or the like. For example, when a PC is used, a still image can be input through a LAN, a USB, or IEEE1394, or the like. The still image may be input by using a storage medium such as a flexible disk or an optical disk.

The data communication unit 13 outputs the received composite signal to the storage unit 14. The storage unit 14 receives the composite signal and stores the composite signal. When the still image and/or the position data included in the composite signal are instructed to be read, the storage unit 14 reads and outputs the data. The storage unit 14 is, for example, a storage such as a semiconductor memory device such as a dynamic random access memory (DRAM), a magnetic storage device such as a hard disk drive (HDD) or a magnetic tape. The synthesizing unit 15 receives the video 9 from the video signal receiving unit 12 and receives the image data and the position data of a still image from the storage unit 14 and synthesizes the image data and the position data. The synthesizing unit 15 outputs the synthesized video (synthesized video 16) as a synthesized video signal. The output synthesized video 16 is displayed on a display unit (not shown) such as a display or the like.

Subsequently, the following example will be considered. That is, the video signal receiving unit 12 receives a video signal expressing the video 9 reproduced by a video player, and the data communication unit 13 receives a still image transmitted from a PC and the position data of the still image.

Figure 3:
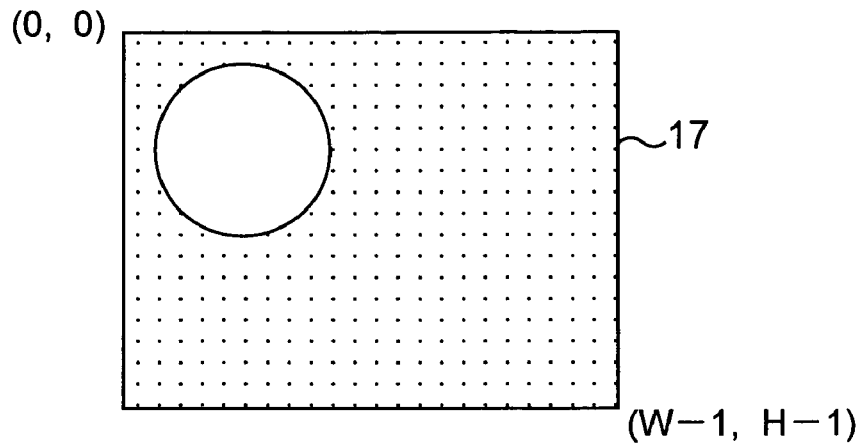
FIG. 3 is a diagram showing a video input to the video synthesizing apparatus.

A manner of inputting a video signal to the video synthesizing apparatus 8 will be described first. FIG. 3 is a diagram showing a video input to the video synthesizing apparatus 8 (FIG. 2). The width and height of a screen on which a video region 17 is displayed are represented by W and H, respectively. These dimensions are expressed by lengths defined in units of pixels. Pixel data of one line of the uppermost part of the region 17 is input. More specifically, pixel data of pixels arranged from a left end (0, 0) to a right end (W−1, 0) are sequentially input. When the pixel data at the right end (W−1, 0), pixels arranged from the left end of the next line to the right end are sequentially input. That is, pixel data between (0, 1) to (W−1, 1) are input. Similarly, pixel data of total H lines are sequentially input. Since the video signal receiving unit 12 (FIG. 2) receives a video signal on the basis of the above procedure, the transmitted video can be obtained.

Figure 4:
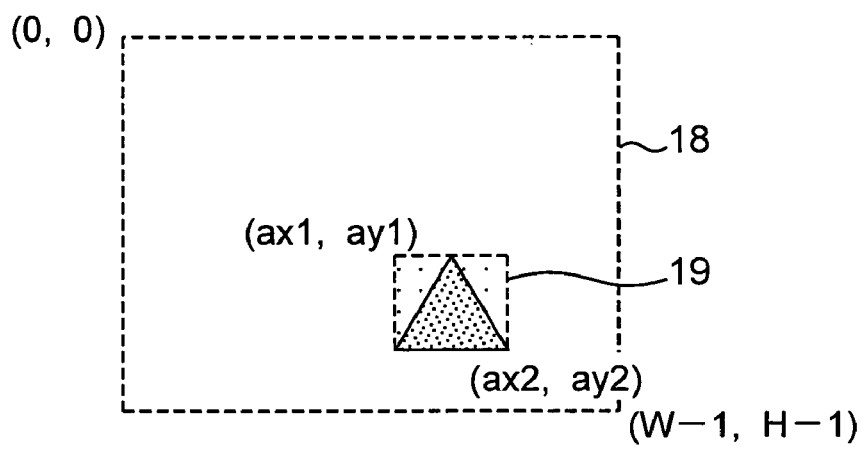
FIG. 4 is a diagram showing a still image input to the video synthesizing apparatus.

A manner of inputting the composite signal in the video synthesizing apparatus 8 will be described below. FIG. 4 is a diagram showing a still image input to the video synthesizing apparatus 8 (FIG. 2). A triangular image in a frame 19 is a still image to be synthesized. It is assumed that the triangular image in the frame 19 is synthesized with a region 18 of the video signal at an illustrated position. Since the video synthesizing apparatus 8 (FIG. 2) synthesizes the still image with the video on the basis of the position data, the still image may be an actually displayed part, i.e., the triangular image in the frame 19.

In this embodiment, in order to make a display process simple, the rectangular region 19 including the triangle is used as a still image. In this case, the region except for the triangle in the rectangle partially constitutes the image data of the still image as data expressing a transparent part.

In order to specify a position where the still image is synthesized, the video synthesizing apparatus 8 (FIG. 2) uses the position data included in the composite signal. In a conventional technique, since there is no data of a position where a still image is displayed, even though a part displayed on a video signal synthesizes a still image with only a part of the video, a still image having the same as that of the region 18 of the entire video must be input. In this embodiment, since the position data is used, a still image having a minimum size is satisfactorily prepared. For this reason, the data amount of the still image to be synthesized can be reduced, and, therefore, a transmission time can be shortened.

The position data 11 of the still image is expressed by upper left coordinates in the rectangular region 19 surrounding the triangle. In the illustrated example, the coordinates are represented by (ax1, ay1). The composite signal is constituted by a signal expressing the still image and a subsequent signal expressing position data. More specifically, the data communication unit 13 receives the still image and then receives the position data. Pixel data of the uppermost line of the frame 19 are input to the data communication unit 13. More specifically, the pixel data of pixels arranged from the left end (ax1, ay1) to the right end (ax2, ay1) are sequentially input. When the pixel data of the right end (ax2, ay1) of the uppermost line is input, a process for the next lower line is started to input the pixel data of pixels arranged from the left end (ax1, ay1+1) to the right end (ax2, ay1+1) are input. Similarly, the pixel data of all the lines in the region 19 are sequentially input. After the still image is input, the position data 11 expressed by (ax1, ay1) is input. The position data has 2-bytes size in an X-coordinate and a Y-coordinate. After the X-coordinate data is input first, the Y-coordinate data is input.

Figure 5:
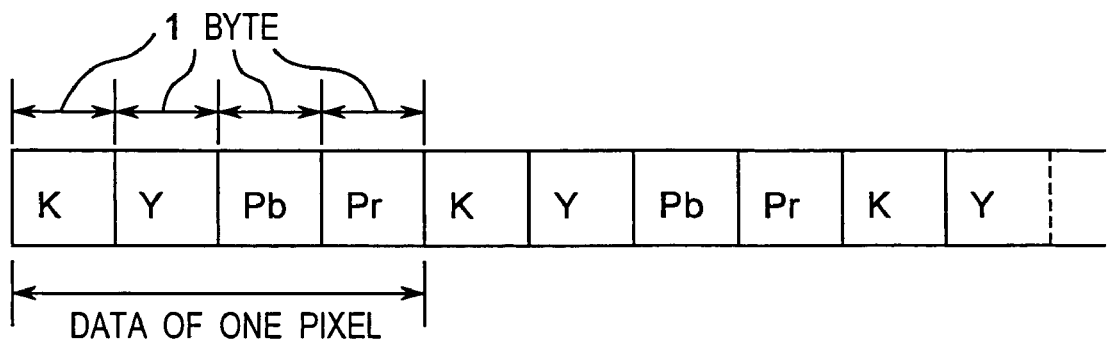
FIG. 5 is a diagram showing the data structure of pixel data.

The configuration of the pixel data of the pixels constituting the still image will be described below. The pixel data are constituted by luminance data Y, color difference data Pb and Pr, and transmittance pixel data K. FIG. 5 is a diagram showing the data structure of the pixel data. As shown in FIG. 5, the pixel data are arranged in an order of, K, Y, Pb, and Pr. The data are input to the video synthesizing apparatus 8 (FIG. 2) in this order. The luminance data Y and the color difference data Pb and Pr are data expressing the colors of pixels. The transmittance data K is data expressing the degrees of transmittance of pixels. When the transmittance K is 0, pixel is displayed in original colors when the still image is synthesized with the video 9 (FIG. 2). When the transmittance K is not 0, it means that pixels displayed in a semitransparent state. Therefore, when the still image is synthesized with the video 9 (FIG. 2), the video 9 (FIG. 2) can be seen through the still image. When the transmittance K is maximum, the pixels become completely transparent, the still image is synthesized with the video 9 such that only the video 9 (FIG. 2) is displayed. These data have 1 byte each and have values of 0 to 255. The pixels constituting the still image are frequently expressed by RGB data constituted by three primary colors, i.e., red, green, and blue. In this case, the data are converted into data Y, Pb, and Pr.

$Y=0.299*R+0.587*+0.114*B$ $Pr=0.5*R-0.4187*G-0.0813*B+128$ $Pb=-0.1687*R-0.3313*G+0.5*B+128$

When the still image is synthesized with the video 9 (FIG. 2), the transmittance K is directly used. However, a still image of some type may have a transmittance. In such a case, the transmittance K is set at 0, and the pixels are directly displayed. More specifically, the still image is synthesized with the video 9 (FIG. 2) such that the video 9 is not seen through the still image. It is noted that the set value of the transmittance K is not limited to 0. A fixed value except for 0 may be set, or the value may be automatically changed depending on elapsed time or the like from when the still image is displayed. Together with the still image and the position data, a transmittance itself or an instruction for controlling a transmittance may be input from the outside. When the still image is input from a PC, the pixel data are converted by a program such as an application operated on the PC to set the position data. In this case, the pixels of the still image are converted into the data Y, Pb, Pr, and K and input. However, the format of the pixels to be input may be arbitrary. A device which inputs the still image may be a device except for a PC.

A manner of storing the still image in the storage unit 14 (FIG. 2) will be described below. The still image and the position data thereof received by the data communication unit 13 (FIG. 2) are stored in the storage unit 14. In this embodiment, only the still image of a part to be actually displayed is received by the data communication unit 13 (FIG. 2). Therefore, since an image of a region having the same size as that of the video 9 (FIG. 2) to be synthesized is not necessary, a memory capacity spent by the storage unit 14 (FIG. 2) can be considerably reduced. As a matter of course, a storage capacity for storing the still image changes depending on the size of the still image.

Figure 6:
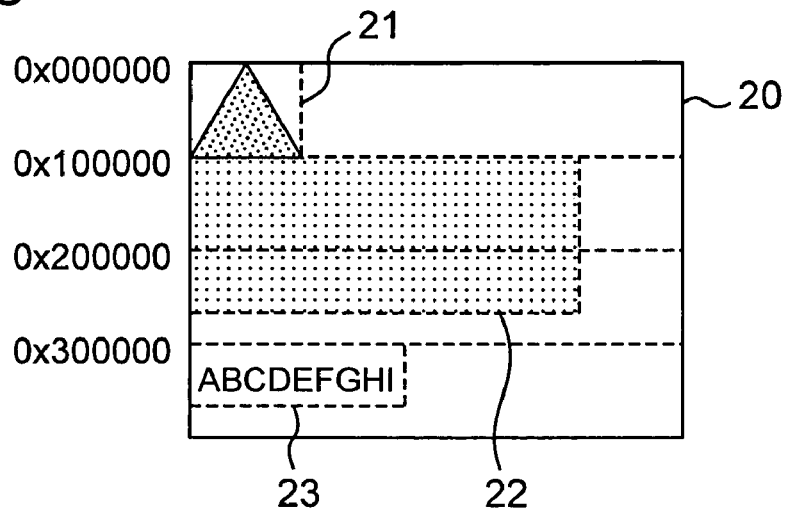
FIG. 6 is a schematic diagram showing a storage state of a still image in a storage unit.

FIG. 6 is a schematic diagram showing a storage state of the still image in the storage unit 14 (FIG. 2). In a partial storage region 20 showing a capacity of one screen, a plurality of still images 21, 22, and 23 are stored. In the partial storage region 20, a region obtained by horizontally and vertically dividing one screen by 4 is used as a minimum management unit. Depending on the vertical length of the still image, i.e., the height ((ay2−ay1) in FIG. 4), the number of management regions is changed, so that the still image can be stored by simple management without wasting a storage region. The still image 21 and the still image 23 have heights which are ¼ the height of one screen. For this reason, only one management region is used. On the other hand, the height of the image 22 is ¼ or more the height of the screen and ½ or less the height of the screen. For this reason, two management regions are used. Management numbers, e.g. 1, 2, . . . , are sequentially allocated to the management regions used as start numbers of regions in which the still images are stored. In the still image 21, the start number is 1, and the number of regions to be used is 1. In the still image 22, the start number is 2, and the number of regions to be used is 2. In the still image 23, the start number is 4, and the number of regions to be used is 1. The start number and the number of regions to be used are stored in a storage region of the storage unit 14 (FIG. 2). The synthesizing unit 15 uses the start number and the number of regions to be used to acquire a still image required when synthesis is performed.

A still image is read in units of management regions. When the still image is displayed on a video, all the management regions containing in the screen are to be displayed. For this reason, when an input part uses only some of management regions as in the still image 21, the other management regions must be constituted by transparent data. In order to constitute the management regions by transparent data, the transmittance K may be set at the maximum value.

Figure 7:
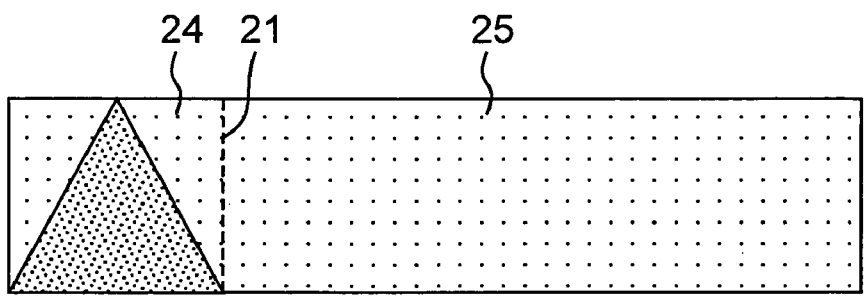
FIG. 7 is an enlarged diagram of a management region including a still image.

FIG. 7 is an enlarged diagram of management regions including the still image 21. The management regions are constituted by a region 24 in which the image data of the still image 21 is written and a region 25 in which the image data of the still image 21 is not written. Since the initial value of a memory element is not always data expressing transparency, when the still image 21 is input and stored in the region 24, the control unit of the video synthesizing apparatus 8 (FIG. 2) sets the storage element of the region 25 at data expressing transparency. Since this operation is only a process which updates the storage region in the video synthesizing apparatus 8 (FIG. 2), the operation can be performed at a speed considerably higher than that when transparent data is input from the outside.

The method of storing a still image is only an example. The order of storage, whether a management region is set or not, the size of the region used when the management region is set, and the like are arbitrary. For example, the size of the management region is made variable depending on the size of data to be stored, a table which stores the start address of the respective management regions and the size of the still image is newly stored in the storage region. In this manner, the storage region can be more saved, and a blank region need not be set to be transparent data in the management region. In addition, the position data of the still image may be stored by any method such that the position data corresponding to the still image can be extracted.

Figure 8:
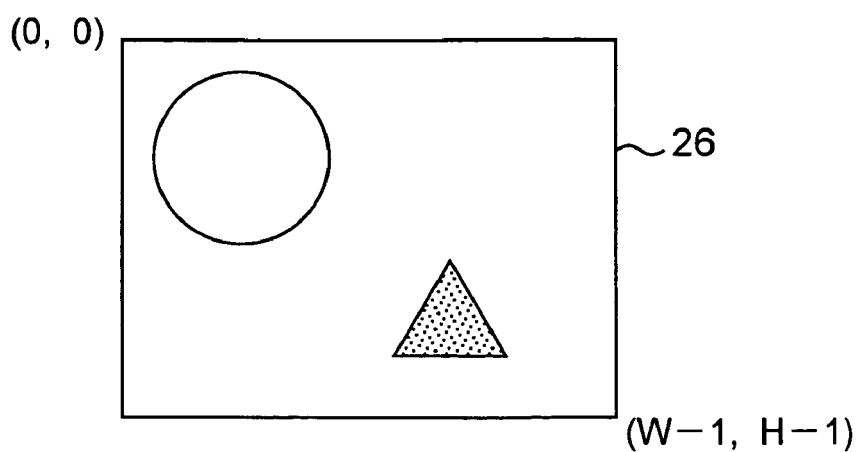
FIG. 8 is a diagram showing a synthesized image obtained by synthesizing a video and a still image.

A procedure of causing synthesizing the synthesizing unit 15 (FIG. 2) to synthesize a video and a still image to generate a synthesized video will be described below. As described above, since a plurality of still images may be stored in the storage region of the storage unit 14 (FIG. 2), a still image required for synthesis must be selected. The synthesizing unit 15 (FIG. 2) designates a management number of the storage region to select a still image. When the management number is designated by the synthesizing unit 15, the storage unit 14 (FIG. 2) reads the start number of the still image stored in the region indicated by the number, the number of used regions, and position data. The synthesizing unit 15 (FIG. 2) reads image data the number of which is equal to the number of used regions from the region indicated by the start number. The synthesizing unit 15 (FIG. 2) receives the image data and the position data of the read still image and synthesizes the image data and the position data with the video signal to display the still image on the video. FIG. 8 is a diagram showing a synthesized image obtained by the video (FIG. 3) with the still image (FIG. 4). It cannot be known until the still image is actually displayed on the screen whether the read image is a necessary still image. Therefore, before the synthesizing process, only the still image shown in FIG. 8 may be displayed.

When the still image data is read, the size and the read start address of the display data to be read may change depending on the display position of the still image. FIGS. 9A and 9B and FIGS. 10A and 10*b* are diagrams showing the relationship between a read operation of the still image and a display operation thereof. The following description is only one example. Synthesis with a video signal is performed by any other method without problems.

Figure 9A:
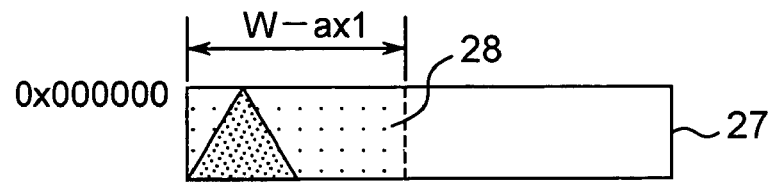
FIG. 9A is a diagram showing a management region in which a data region to be read is stored.
Figure 9B:
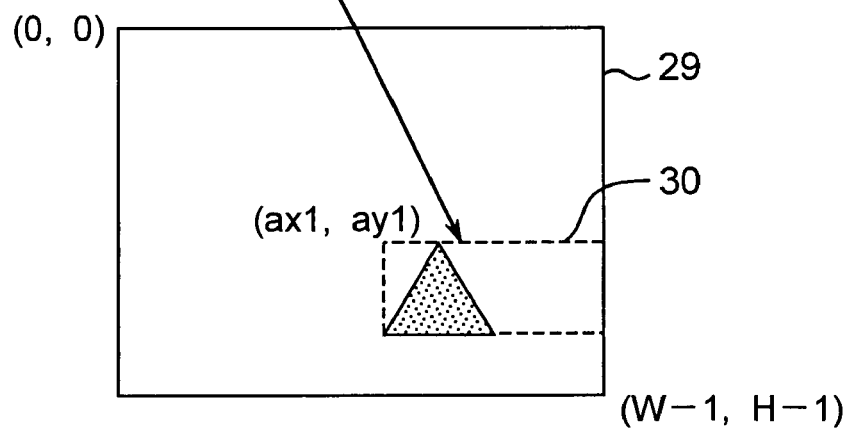
FIG. 9B is a diagram showing a display region including a still image synthesized with a video.

FIGS. 9A and 9B are diagrams showing the relationship between the read operation of the still image and the display operation thereof when the upper left end of the still image is located at a position (ax1, ay1) in the video to be synthesized. FIG. 9A shows a management region 27 in which a data region 28 to be read is stored. FIG. 9B shows a display region 30 synthesized with a video 29 and including a still image. In this example, the still image is displayed from the upper left end of the still image. Since the width of the displayed region 30 is expressed by (W−ax1), the synthesizing unit 15 (FIG. 2) reads data of a management region having a width of (W−ax1) and a height of 1 from 0x000000 which is the start address of the management region 27. As described above, since one pixel is constituted by 4-bytes data, as data of the first one line, (W−ax1)*4-bytes data from 0x000000 is read. Subsequently, an operation of reading (W−ax1)*4-bytes data while the read start address is increased from 0x000000 (W*4) by (W*4) may be repeated.

Figure 10A:
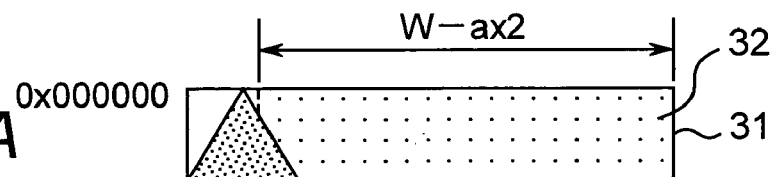
FIG. 10A is a diagram showing a management region in which a data region to be read is stored.
Figure 10B:
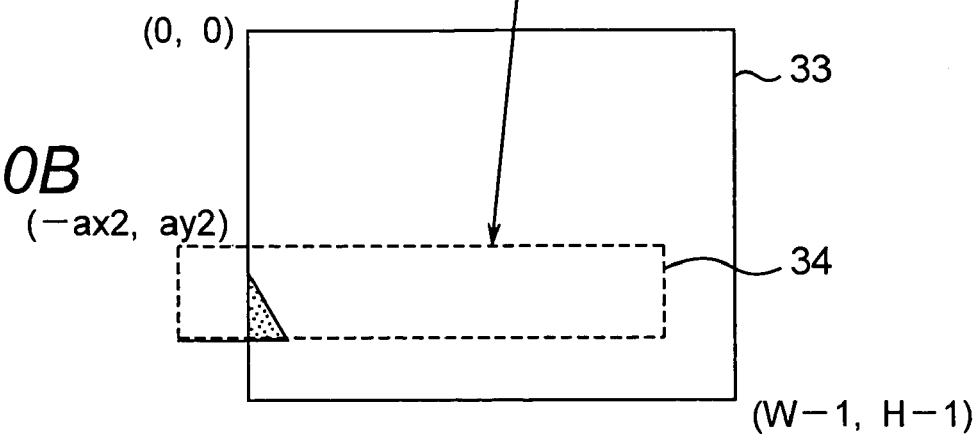
FIG. 10B is a diagram showing a display region including a still image synthesized with a video.

FIGS. 10a and 10B are diagrams showing the relationship between a read operation of a still image and a display operation thereof when the upper left end of the still image is located at a position (−ax2, ay2) outside a video to be synthesized. FIG. 10A shows a management region 31 in which read data region 32 is stored. FIG. 10B shows a display region 34 including a still image synthesized with a video 33. In this example, the still image is displayed from a position moving from the upper left end of the still image by ax2 in an X direction. Therefore, the read start address is 0x00000+ax2*4. Since the data region 32 to be displayed is a region of a management region having a width of W−ax2 and a height of 1, the synthesizing unit 15 (FIG. 2) reads (W−ax2)*4-bytes data as data of the first one line from 0x000000+ax2*4. Subsequently, an operation of reading (W−ax2)*4-bytes data while the read start address is increased from 0x000000+ax2*4 (W*4) by (W*4) may be repeated.

The position data of the still image stored in the storage unit 14 need not be updated by data input from the outside. A change control unit (not shown) operated by a program for changing position data of the video synthesizing apparatus 8 (FIG. 2) may change the position data stored in the storage unit 14 (FIG. 2). In this case, the position data is continuously changed by a program process, so that a process of moving the still image displayed on the video from the left of the screen to the right can be realized.

Figure 11A:
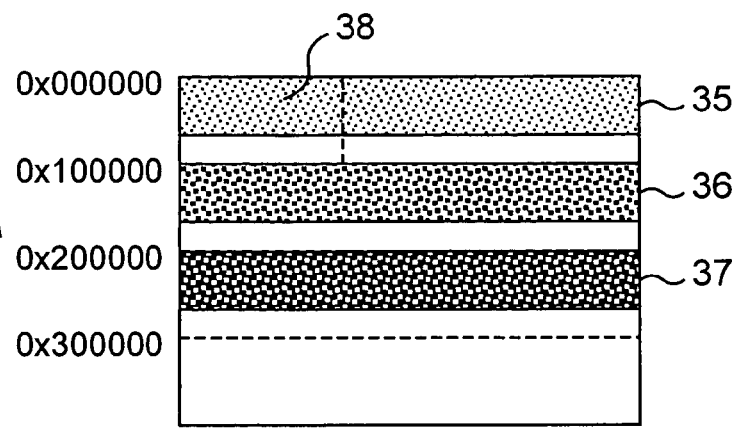
FIGS. 11A and 11B are diagrams showing a still image on an image region, a still image on a storage region, a still image on a storage region, a region of a still image to be read, a region of a video signal to be input, and a still image 40 to be displayed.
Figure 11B:
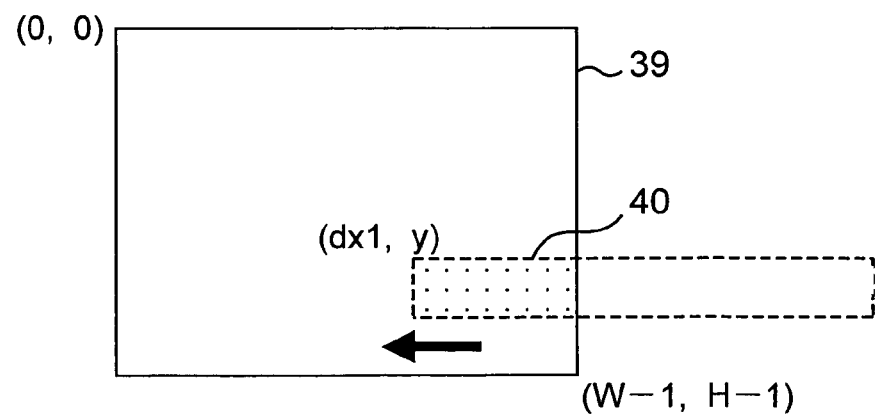
Figure 12A:
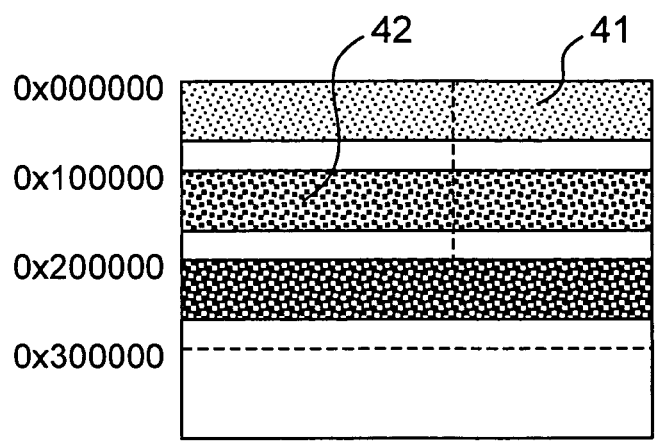
FIGS. 12A and 12B are diagrams showing a region of a still image to be read, a region of a still image to be read, and a still image to be displayed.
Figure 12B:
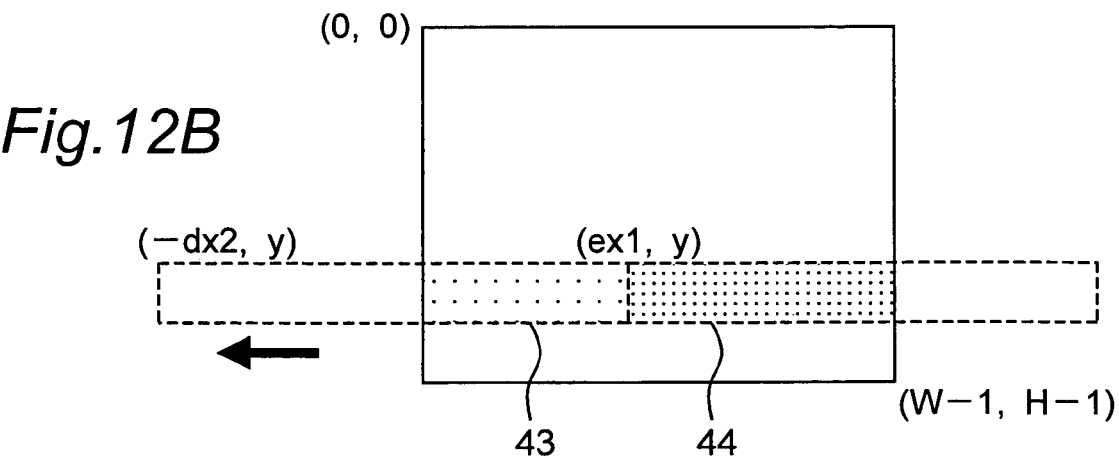
Figure 13A:
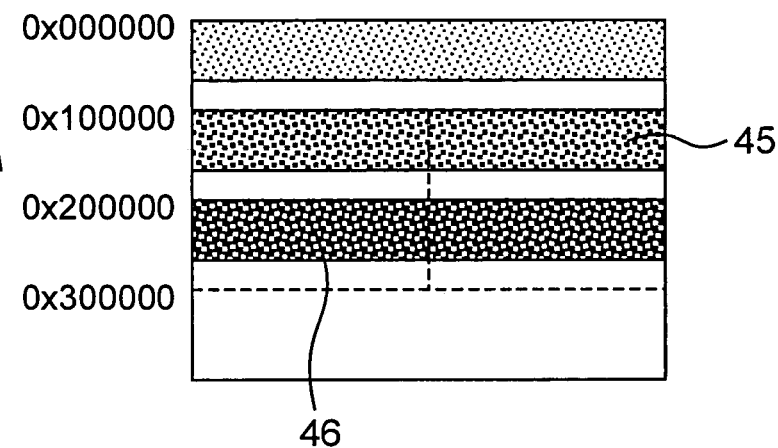
FIGS. 13A and 13B are diagram showing a region of a still image to be read, a region of a still image to be read, and a still image to be displayed.
Figure 13B:
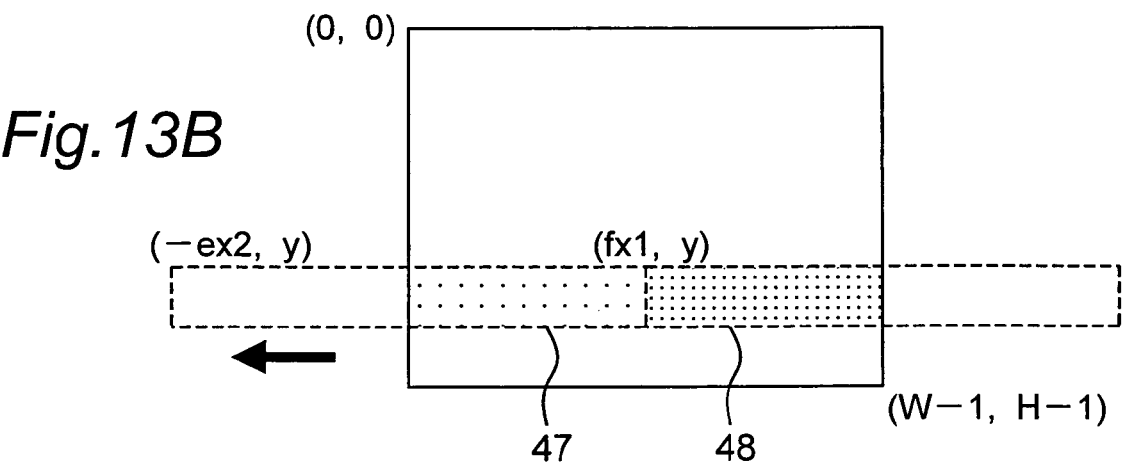
Figure 14A:
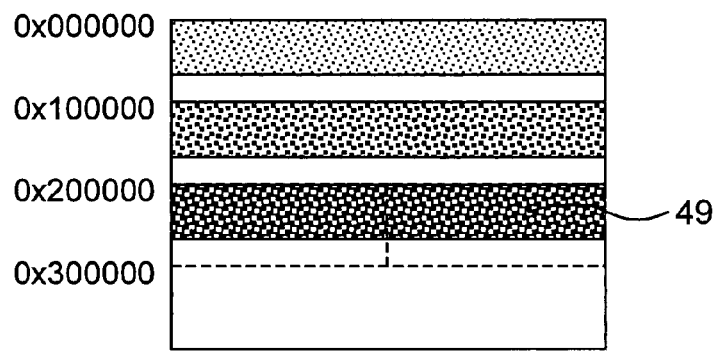
FIGS. 14A and 14B are diagram showing a region of a still image to be read and a still image to be displayed.
Figure 14B:
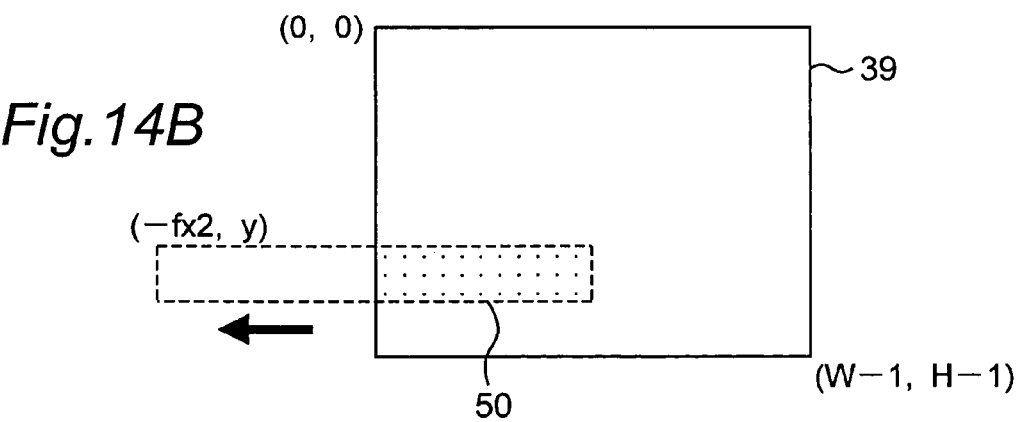

In this case, when a plurality of still images are displayed on the video, the position data of the still images are continuously changed to make it possible to display a horizontally and vertically long still image by scrolling. For example, a case in which a narrow long image having a length corresponding to 3 horizontal screens appears from the right of the screen, scrolls to the left, and then disappears to the left of the screen will be considered. The video synthesizing apparatus 8 (FIG. 2) divides a screen in units of screens, and a display process is performed to each divided image. FIGS. 11A to 14B are diagrams for explaining a procedure of a scroll display process. In FIGS. 11A and 11B, a storage region 35 on a storage region, a still image 36 on the still image, a still image 37 on the still image, a region 38 of the storage region 35 to be read, a region 39 of a video signal to be input, and a still image 40 to be displayed are shown. In FIGS. 12A and 12B, a region 41 of the storage region 35 (FIG. 11A) to be read, a region 42 of the still image 36 (FIG. 11A) to be read, and still images 43 and 44 to be displayed are shown. In FIGS. 13A and 13B, a region 45 of the still image 36 (FIG. 11A) to be read, a region 46 of the still image 37 (FIG. 11A) to be read, and still images 47 and 48 to be displayed are shown. In FIGS. 14A and 14B, a region 49 of the still image 37 (FIG. 11A) to be read and a still image 50 to be displayed are shown.

Referring to FIG. 11B, the first storage region 35 of the three still images appears from the left of the screen. The first position data of the storage region 35 is (W−1, y) at the right end of the screen. Thereafter, the X-coordinate is changes by a set shift amount every predetermined time, and a process of changing the display position of the still image is performed. When the shift amount is constant and a value which is small to some extent, it appears that the storage region 35 scrolls. FIG. 11B shows an example in which the position of the still image 40 is given by (dx1, y). Since the upper left end of the still image 40 is located on the screen, the method of reading the image from the storage region is the same as that shown in FIGS. 9a and 9B, and W−dx1 pixel data are read from the start address 0x000000 of the storage region line by line.

When the still image 40 moves to cause the left to the left end thereof to run out of the left of the screen, the next still image 36 is displayed to be next to the still image 40. The display position of the still image 36 is a position shifting from the upper right end of the still image 40 by a pixel. After the still image 36 is displayed on the screen, a display position change process of the still image 36 is performed after the display position change process of the storage region 35 is performed. In this case, as a shift amount of the still image 36, the same value as that of the storage region 35 is used.

FIG. 12B are diagram showing the first still image 43 and the subsequent second still image 44. The still image 43 is a part of the storage region 35 (FIG. 11A), and the still image 44 is a part of the still image 36 (FIG. 11A). FIG. 12A shows an example obtained when the position of the still image 43 the position of the still image 44 are given by (−x2, y) and (ex1, y), respectively. Since the upper left end of the still image 43 is outside the screen, a method of reading data from the storage region is the same as in the example shown in FIGS. 10A and 10B. More specifically, W−dx2 pixel data are read line by line from 0x000000+dx2*4 obtained by adding an offset of dx2 pixels to the start address of the storage region. Since the upper left end of the still image 44 is located on the screen, the method of reading data from the storage region is the same as that of the example shown in FIGS. 9A and 9B, and W−ex1 pixel data are read from the start address 0x100000 of the storage region line by line.

After the still image 43 completely runs out of the screen, the display process of the still image 44 and the still image 37 (FIG. 11A) is performed. This process is the same as the display process of the still image 43 and the still image 44. FIG. 13B is a diagram showing the second still image 47 and the subsequent third still image 48. The still image 47 is a part of the still image 36 (FIG. 11A), and the still image 48 is a part of the still image 37 (FIG. 11A).

After the still image 47 completely runs out the screen, the display process of only the still image 48 is performed. FIG. 14B is a diagram showing an example obtained when the display position of the still image 50 is given by (−fx2, y). The still image 50 is a part of the still image 37 (FIG. 11A). Since the upper left end of the still image 50 is located outside the screen, the method of reading data from the storage region is the same as that in the example shown in FIGS. 10A and 10B. More specifically, W−fx2 pixel data are read line by line from 0x200000+fx2*4 obtained by adding an offset of fx2 pixels to the start address of the storage region. When the still image 50 completely runs out of the screen, all the display processes are ended.

The above example illustrates a case in which the image including three screens is horizontally scrolled. However, the still image may not always be displayed on three screens. When a vertically long image is vertically scrolled, the image may be similarly divided, and display positions of the divided images may be changed.

Image synthesis is not always applied to a combination of a video signal and a still image. For example, the video synthesizing apparatus 8 (FIG. 2) can also synthesize a still image with another still image to output a synthesized image. When a background need not be moved, a video synthesizing system for only still images is structured to make it possible to suppress the cost of the system.

The video synthesizing apparatus according to this embodiment is not always applied to synthesis a still image with an input video. More specifically, the video synthesizing apparatus may have a function of loading one frame of the input video, converting the frame into a frame still image, and outputting the frame still image. The still image including the video signal is accumulated in an external device. The still image may be input to the video synthesizing apparatus and used as a background image later. Communication between the video synthesizing apparatus and the external device uses a data communication unit which performs data communication.

Figure 15:
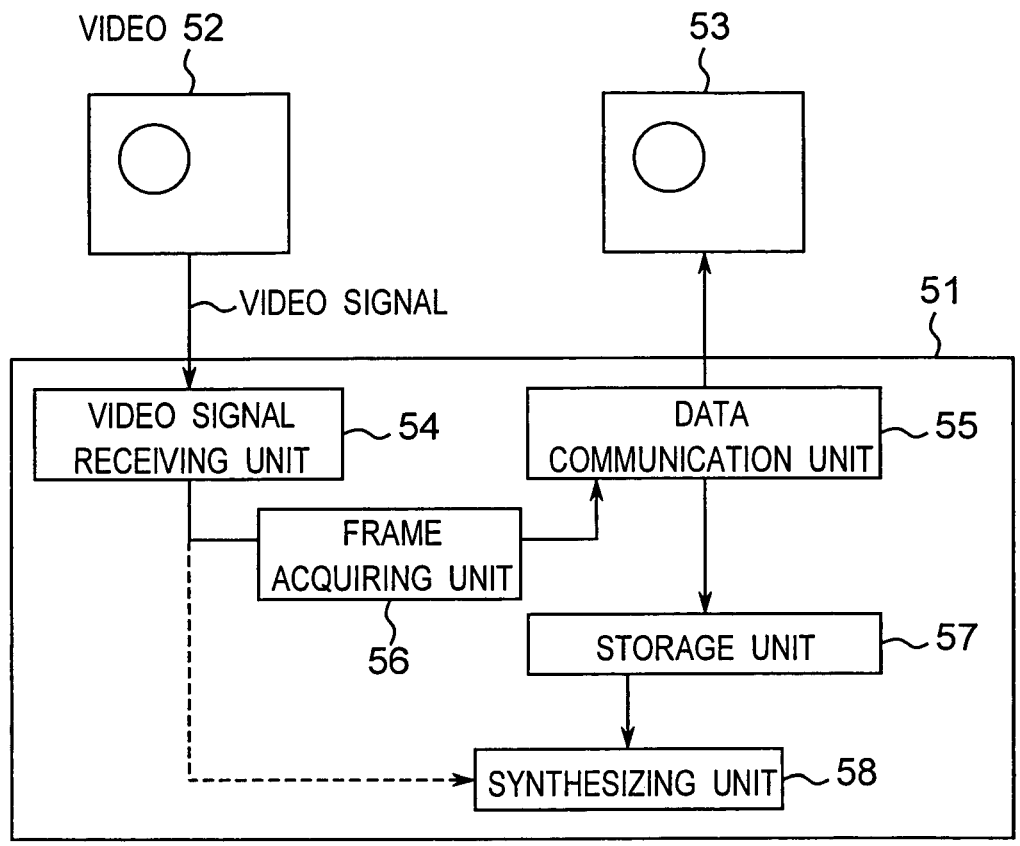
FIG. 15 is a block diagram showing the configuration of a second video synthesizing apparatus according to the embodiment.

FIG. 15 is a block diagram showing the configuration of a video synthesizing apparatus 51 according to this embodiment. The video synthesizing apparatus 51 includes a video signal receiving unit 54, a data communication unit 55, a frame acquiring unit 56, a storage unit 57, and a synthesizing unit 58. The data communication unit 55 has a function equivalent to the function of the data communication unit 13 (FIG. 2), and also has a data transmission function to an external device. The video synthesizing apparatus 51, like the video synthesizing apparatus 8 (FIG. 2), has a function of synthesizing a video and a still image to output a synthesized video. Since the same reference names as in the video synthesizing apparatus 8 denote the same constituent elements in the video synthesizing apparatus 51, a description thereof will be omitted.

The operations of the frame acquiring unit 56 which is newly arranged in the video synthesizing apparatus 51 and the video synthesizing apparatus 51 related to the frame acquiring unit 56 will be described below. The frame acquiring unit 56 uses a video signal input to the video signal receiving unit 54 and expressing a video 52 to extract and acquire the frames of the video 52. When the frames are loaded, the transmission path for the vide signal in the video synthesizing apparatus 51 is switched, and the video signal is input to the frame acquiring unit 56. The frame acquiring unit 56 loads the frame of the video signal when a loading instruction is received, and outputs the frame to the outside by using the data communication unit 55. Since one frame of the video signal is loaded as a still image, the size of the still image to be output is always equal to the size (W, H) of the video signal.

As in a still image to be input, pixel data are constituted by luminance data Y, color difference data Pb and Pr, and transmittance data K. The pixel data have a size of 1 byte each, and output in an order of K, Y, Pb, and Pr. Although the luminance data Y and the color difference data Pb and Pr can be directly obtained from the video signal, the transmittance data is not included in the video signal. For this reason, the transmittance is set to be 0 to directly display original pixels. The set value of the transmittance K is not always 0. The value may be set at a fixed value except for 0, and may be automatically changed by the image synthesizing apparatus depending on elapsed time or the like from when the still image starts to be displayed. Together with the still image and the position data, a transmittance itself or an instruction for controlling a transmittance may be input from the outside.

A transmission order of pixels constituting a frame is the same as that in a still image to be input. Pixels of the first line extending from the upper left end of the image to the upper right end of the image are transmitted. Thereafter, pixels of the second line are transmitted, and, similarly, pixels up to the lowermost line are transmitted.

An example in which the frames of a video signal are loaded and output is described above. However, this is only an example, and the video signal can be loaded by any other method without problems. For example, a still image loaded by the frame acquiring unit 56 can also be input to the storage unit 57. The still image loaded by the frame acquiring unit 56 may be automatically enlarged, reduced, or rotated and then synthesized with a video signal. A magnification, a reduction ratio, and a rotating angle which are used at that time may be fixed values held in the synthesizing unit 58. A control method for these values may be stored in advance, or the magnification, the reduction ratio, the rotating angle, and the control method may be input from the outside.

In the video synthesizing apparatus 8 (FIG. 2) or the video synthesizing apparatus 51, by using a data communication unit which receives a still image and position data thereof, control data can be transmitted or received. The control data is data for controlling the operation of the video synthesizing apparatus. The control data is transmitted from the external device to the video synthesizing apparatus or transmitted from the video synthesizing apparatus to the external device.

Functions of the control data are as follows. As the functions of the control data transmitted from the image synthesizing apparatus to the external device, (a) a change in display position of a still image, (b) a change in display method of a still image, (c) delete of a still image from the storage unit, (d) control (reproduction, pause, stop, and the like) of a synthesized image output, (e) operation environment setting of the main body, and the like are known. As control data transmitted from the image synthesizing apparatus to the external device, (f) response data to control from the external device, (g) a current operation state, (h) maintenance information such as operating time, and the like are known.

Figure 16:
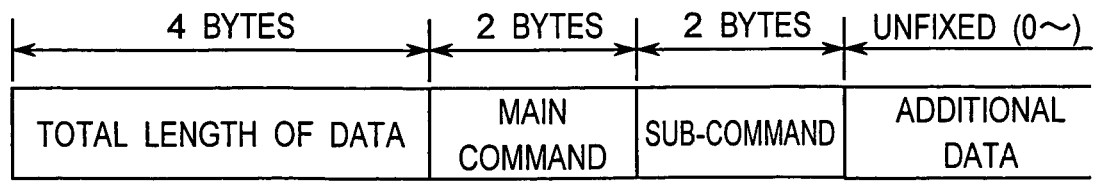
FIG. 16 is a diagram showing a transmission order of control data.

The control data includes data (main command) for specifying the functions and parameters (sub-commands) required for the functions. The parameters, for examples, are data expressing the display position of a changed still image with respect to the function (a) and data expressing operation states such as "in synthesis", "synthesis completion", and the like with respect to the function (g). FIG. 16 is a diagram showing an example of transmission order of control data. A requested operation is determined on the basis of a main command and a sub-command. These commands have a size of 2 bytes each. When necessary data cannot be transmitted by only the main command and the sub-command, the data is transmitted with additional data. Since the length of the additional data changes depending on a requested operation, the reception side must know the length of the received control data. The length of the control data is stored at the head of the control data to have a 4-bytes length. When there is no additional data, the length of the entire control data is 8 bytes. When the additional data is 4-bytes data, the length of the entire control data is 12 bytes. Not only the control data but also a still image can be transmitted in such a format. For example, when a still image having 100×100 pixels is transmitted, the amount data of the still image is 100×100×4=40000 bytes. For this reason, the total length of the data may be set at 40008 bytes, and the still image may be transmitted as additional data.

The transmission/reception of the control data has been described. The above description is only an example, and another method can also be employed. The use of the control data makes it possible to perform apparatus control from the outside, and the image synthesizing apparatus can be controlled from a distant place with low cost to make it possible to output a synthesized image.

In the image synthesizing apparatus when an information amount of a video or a still image included in an input video signal or a composite signal is compressed, the state of the video or the still image is returned to a non-compression state to perform a synthesizing process. The information amount of the video included in the video signal and the information amount of the still image data of the composite signal are compressed (coded) in conformity to MPEG-2 standards and then decoded.

When the band of a transmission path to which a video signal and/or a composite signal is small, in order to minimize the information amount of the signal to be transmitted and to assure preferable image quality, transmission may be performed while only the still image of a telop is not compressed. When character data such as a telop is compressed, deterioration of the image quality is conspicuous. In such a case, a conventional image synthesizing apparatus requires the data of an entire screen as a still image, an amount of data to be transmitted increases. However, in the image synthesizing apparatus according to the embodiment, the data of only a character part may be transmitted, an amount of data is small even though the data is not compressed. Therefore, the video signal is handled in a compression state, and the composite signal is handled in a non-compression state, so that the image can be synthesized with good image quality even if a transmission path as a narrow band.

As at least one of the video signal receiving unit and the data communication unit, an interface unit between a mobile recording medium (for example, SD (Secure Digital) card or a DVD-RAM) and a reproducing device can also be used. For example, when the video synthesizing apparatus is a PC, a video signal may be transmitted from a DVD-RAM drive serving as an external device to the video signal receiving unit having an IEEE1394 interface function. In this manner, an image material formed at a distant place can also be used in synthesis. The video signal receiving unit and/or the data communication unit are connected to a cable network or a wireless network, so that the image material formed at the distant place can also be used in synthesis.

In the embodiment described in this specification, the transmission path for the video signal and the transmission path for the composite signal are different transmission paths. However, in place of these transmission paths, one transmission path is used, and all the data may be transmitted at once. A composite signal (still image and position data thereof is interleaved in a blanking part except for a part expressing a video, all the signals can be input by one transmission path. Separation of the composite signal at the blanking part may be performed by video signal receiving unit or the data transmission unit.

The invention claimed is:

1. A video synthesizing apparatus which synthesizes a video with a still image, comprising:
   a video signal receiving unit which receives a video signal including a video;
   a communication unit which receives a composite signal including a still image having a display size smaller than the display size of the video and position data expressing a synthesis position of the still image with respect to the video;
   a storage unit which stores the still image and the position data obtained from the composite signal received by the communication unit;
   a synthesizing unit which synthesizes the video obtained from the video signal received by the video signal receiving unit and the still image stored in the storage unit on the basis of the position data stored in the storage unit to output a synthesized image; and
   a change control unit which continuously changes the position data stored in the storage unit to continuously change a synthesis position of the still image with respect to the video.

2. A video synthesizing apparatus according to claim 1, further comprising a frame acquiring unit which acquires the video obtained from the video signal as a frame image,
   wherein the communication unit outputs the frame image acquired by the frame acquiring unit.

3. A video synthesizing apparatus according to claim 1, wherein the communication unit transmits and receives a control command for controlling an operation of the video synthesizing apparatus.

4. A video synthesizing apparatus according to claim 1, wherein an information amount of the video included in the video signal is compressed.

5. A video synthesizing apparatus according to claim 1, wherein an information amount of the still image included in the composite signal is compressed.

6. A video synthesizing apparatus according to claim 1, wherein an information amount of the video included in the video signal is compressed, and an information amount of the still image included in the composite signal is not compressed.

7. A video synthesizing apparatus according to claim 1, wherein the video signal receiving unit receives a video signal generated on the basis of data recorded on a mobile recording medium.

8. A video synthesizing apparatus according to claim 1, wherein the communication unit receives a composite signal generated on the basis of the data recorded on the mobile recording medium.

9. A video synthesizing apparatus according to claim 1, wherein at least one of the video signal receiving unit and the communication unit is connected to a network for transmitting data and receives at least one of the video signal and the composite signal from the network.

10. A video synthesizing apparatus according to claim 1, wherein the video signal has a part expressing a video and a blanking part except for the part expressing the video, the composite signal is interleaved in the blanking part of the video signal, and
   the video signal receiving unit separates the composite signal from the received video signal to transmit the composite signal to the communication unit.

11. A video synthesizing apparatus which synthesizes a video with a still image, comprising:
   a video signal receiving unit which receives a video signal including a video;

a communication unit which receives a composite signal including a still image having a display size smaller than the display size of the video and position data expressing a synthesis position of the still image with respect to the video;

a storage unit which stores the plurality of still images obtained from the composite signal received by the communication unit and the plurality of position data corresponding to the plurality of still images;

a synthesizing unit which synthesizes the video obtained from the video signal received by the video signal receiving unit and the plurality of still images stored in the storage unit on the basis of the plurality of position data stored in the storage unit to output synthesized images; and a change control unit which continuously changes the position data stored in the storage unit to continuously change a synthesis position of the still image with respect to the video.

* * * * *